United States Patent
Yamamoto et al.

(10) Patent No.: US 8,726,839 B2
(45) Date of Patent: May 20, 2014

(54) MATERIAL FOR TREATING EXCRETION OF PET

(75) Inventors: Jun Yamamoto, Sumida-ku (JP); Yasuki Tsutsumi, Sumida-ku (JP); Hiroyuki Yamada, Sumida-ku (JP)

(73) Assignee: Kao Corporation, Tokyo (JP)

(*) Notice: Subject to any disclaimer, the term of this patent is extended or adjusted under 35 U.S.C. 154(b) by 1129 days.

(21) Appl. No.: 11/814,689

(22) PCT Filed: Jan. 31, 2006

(86) PCT No.: PCT/JP2006/301497
§ 371 (c)(1),
(2), (4) Date: Dec. 13, 2007

(87) PCT Pub. No.: WO2006/080514
PCT Pub. Date: Aug. 3, 2006

(65) Prior Publication Data
US 2009/0013936 A1    Jan. 15, 2009

(30) Foreign Application Priority Data
Jan. 31, 2005 (JP) .................................. 2005-23472

(51) Int. Cl.
*A01K 1/01* (2006.01)
*A01K 29/00* (2006.01)

(52) U.S. Cl.
USPC .......................................... 119/171; 119/172

(58) Field of Classification Search
USPC ............ 119/171, 172; 424/76.6; 502/400.401
IPC .............................................. A01K 1/015,29/00
See application file for complete search history.

(56) References Cited

U.S. PATENT DOCUMENTS

| 4,883,021 A | * | 11/1989 | Ducharme et al. | 119/171 |
| 4,924,808 A | * | 5/1990 | Pirotte | 119/171 |
| 2003/0131799 A1 | * | 7/2003 | Wong et al. | 119/171 |
| 2006/0219183 A1 | * | 10/2006 | Yasukawa | 119/171 |

FOREIGN PATENT DOCUMENTS

| JP | 58 111625 | 7/1983 |
| JP | 7-67489 | 3/1995 |
| JP | 9 308403 | 12/1997 |
| JP | 2001 258416 | 9/2001 |
| JP | 2002 84909 | 3/2002 |
| JP | 2003 180182 | 7/2003 |

OTHER PUBLICATIONS

English translation of JP Patent 2002-084909 (see attached).*
U.S. Appl. No. 12/090,149, filed Apr. 14, 2008, Tsutsumi, et al.

* cited by examiner

*Primary Examiner* — David Parsley
(74) *Attorney, Agent, or Firm* — Oblon, Spivak, McClelland, Maier & Neustadt, L.L.P.

(57) ABSTRACT

A pet excreta treating material made mainly of a ground material of plant origin and having a higher water absorbency in the third measurement than in the first measurement, a water absorbency of 3% to 30% by weight in the third measurement, and a specific gravity of 0.8 to 1.2 measured before the first water absorbency measurement. The water absorbency is measured by immersing a dried excreta treating material in 25° C. water for 3 seconds and calculating the weight increase by the equation below, which is taken as water absorbency (%). In the second and following measurements, the excreta treating material immediately after the preceding measurement is dried and immersed in 25° C. water for 3 seconds to obtain a water absorbency in the same manner.

Water absorbency (%)=[(weight of excreta treating material after immersion−weight of excreta treating material before immersion)/(weight of excreta treating material before immersion)]×100.

13 Claims, 1 Drawing Sheet

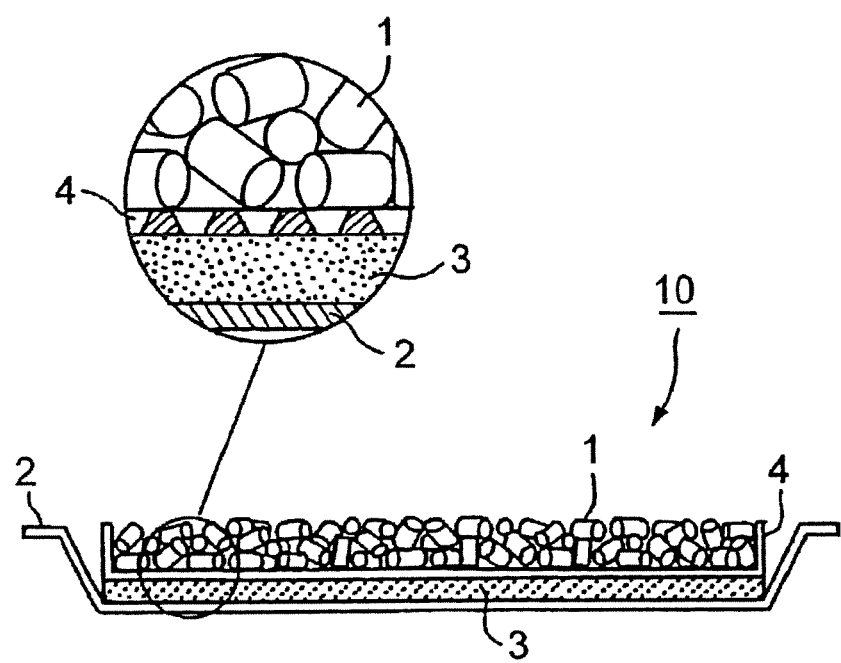

MATERIAL FOR TREATING EXCRETION OF PET

TECHNICAL FIELD

The present invention relates to a pet excreta treating material used to treat excreta of pets such as cats and dogs, and more particularly a pet excreta treating material used in a litter box, particularly for cats, partitioned by a drainboard into an upper compartment and a lower compartment, with the excreta treating material in the upper compartment.

BACKGROUND ART

Known pet toilet systems for treating the excreta of pets such as cats and dogs include those disclosed in JP 7-67489A and JP 2003-180182A, in which a toilet box is partitioned into upper and lower compartments by a foraminous member (drainboard), with an excreta treating material put in the upper compartment and a urine absorbent member made of an absorbent polymer, plant fiber, pulp, etc. set in the lower compartment.

According to these pet toilet systems, liquid waste discharged by a pet animal is allowed to quickly pass the excreta treating material placed in the upper compartment, drop through the drain holes of the drainboard, and be positively absorbed by an urine absorbent member, such as a urine absorbing mat, laid in the lower compartment of the toilet box. The excreta treating material is exemplified by litter obtained by heat compressing a ground material comprising softwood sawdust into pellets that self-disintegrate upon water absorption (see JP 9-308403A).

JP 2002-84909A discloses a technique of an excreta treating material prepared by molding a combination of a ground material of plant origin and a synthetic resin into pellets having sufficient shape retention so as not to disintegrate upon water absorption. The technique is established by designing a dusting ratio at 5% or less and a water absorption rate at 10% or less when immersed in 25° C. water for five seconds.

DISCLOSURE OF THE INVENTION

The present invention provides a pet excreta treating material containing a ground material of plant origin as a main component. The excreta treating material has a higher water absorbency in the third measurement than in the first measurement, a water absorbency of 3% to 30% by weight in the third measurement, and a specific gravity of 0.8 to 1.2 as measured before the first measurement of water absorbency. The measurement of water absorbency is carried out as follows.

[Method of Water Absorbency Measurement]

An excreta treating material having been dried in a thermostat at 40° C. for 2 hours is immersed in 25° C. water for 3 seconds, and the resulting weight increase as represented by the following equation is taken as the water absorbency (%). The second and following measurements are carried out by drying the excreta treating material immediately after the preceding measurement in a thermostat at 40° C. for 2 hours, immersing the dried material in 25° C. water for 3 seconds, and calculating the water absorbency (%) in the same manner as in the first measurement.

Water absorbency (%)=[(weight of excreta treating material after immersion−weight of excreta treating material before immersion)/(weight of excreta treating material before immersion)]×100

BRIEF DESCRIPTION OF THE DRAWINGS

FIG. 1 schematically illustrates an embodiment and usage of the pet excreta treating material according to the present invention.

DETAILED DESCRIPTION OF THE INVENTION

When the conventional litter that self-disintegrates upon water absorption is used in a pet toilet, it would be very time-consuming to change only the litter because the litter having absorbed urine disintegrates, drops through the openings of the foraminous member, and scatters over the urine absorbent member. Furthermore, part of the disintegrated litter remains on the foraminous member to emanate an offensive odor. Moreover, the litter must be replaced with a fresh one each time the litter disintegrates upon urine absorption, which is uneconomical.

When the excreta treating material having sufficient shape retention which does not disintegrate upon water absorption is used in the pet toilet, it continues performing the function sufficiently for a period of use of about one week to one month. However, when used for a prolonged period of time exceeding one month, the excreta treating material swollen with cat's urine reduces in deodorizing performance and needs replacement with a fresh one. To reduce such pet owner's burden, an excreta treating material is required to have further improved water resisting force against swelling or disintegration, guaranteed high deodorizing properties, and appearance stability such that any change in physical properties may not be perceived by a pet owner.

An object of the present invention is to provide a pet excreta treating material that lasts long without need for removal or replenishment, undergoes little change in appearance, exhibits a water resisting force against swell or disintegration, and maintains a high level of deodorizing performance during long-term use, for example, for more than one month.

A pet toilet system is required to maintain its performance withstanding repeated urination. For example, cat litter merely designed to have increased water repellency allows urine to remain adhered to the surface thereof and to generate unpleasant odors. Cat litter is therefore required to timely absorb urine and to maintain deodorizing performance. Nevertheless, cat litter reduces the deodorizing effect with urine absorption. That is, litter is required to have high performance properties of being capable of absorbing urine with a long-lasting deodorizing effect.

The present inventors have carried out a study to obtain a long-lasting high deodorizing effect from a ground material of plant origin. As a result, they have found it effective to design an excreta treating material molded out of the material so as to slowly swell with use thereby to expose a new inside surface thereof having a preserved deodorizing function. They have ascertained that it is necessary that the progress of swelling should be such that does not result in disintegration and discovered the optimum range of such a degree of swelling. The present invention has been reached based on these findings.

The pet excreta treating material (also described below simply as the excreta treating material) of the present invention is a molded product of prescribed shape containing a ground material of plant origin as a main component. An exemplary shape of the excreta treating material is illustrated in FIG. 1, in which an excreta treating material 1 is a columnar molded pellet having a height which is slightly larger than its diameter. The diameter is about 5 to 7 mm, and the height is about 3 to 15 mm.

The excreta treating material 1 can be used by placing in a shallow tray of a litter box but is preferably used in a pet excreta treating system 10 shown in FIG. 1. The pet excreta treating system 10 includes a tray 2 and a permeable drainboard 4. An excreta absorbent member 3 of a plate or sheet form is set in the tray 2, and the excreta treating material 1 is placed on the drainboard 4 in a layer.

The excreta treating material 1 is porous and water absorbent. The absorbency is attributed to the excreta treating material 1 being porous and containing a material of plant origin. It is not essential for the excreta treating material 1 to have high absorbency. It is rather preferred that the excreta treating material 1 have moderate absorbency and, upon water absorption, gradually swell to expose its inside to exhibit increased absorbency in a subsequent absorption. The absorbency of the excreta treating material 1 is measured in accordance with the following method.

[Method of Absorbency Measurement]

The excreta treating material weighing 70±1 g is put in an 80 mm diameter, 100 mm high cylinder with a net bottom (mesh size: 2.8 mm). The cylinder and contents are immersed in water at 25±3° C. for 3 seconds. After the cylinder is taken out of water, water adhered to the cylinder is wiped up with an absorbent sheet (Kim Towel, a trade name, available from CRECIA; weight: 30 g/m$^2$). The contents are transferred into another cylinder of the same kind and weighed to obtain the weight of the excreta treating material 1. The difference between the thus measured weight of the excreta treating material 1 and the weight of the excreta treating material 1 measured before immersion is the amount of water absorbed, from which is calculated a water absorbency (%) of the excreta treating material according to the equation:

Water absorbency (%)=[(weight of excreta treating material after immersion−weight of excreta treating material before immersion)/(weight of excreta treating material before immersion)]×100

It is preferred that the excreta treating material 1 have a water absorbency of 2% to 9% by weight, more preferably 3% to 8% by weight, even more preferably 4% to 7% by weight, in the first measurement in view of water repellency, shape retention, swelling properties, and deodorizing effect.

The excreta treating material of the present invention should have its water absorbency increased in the third measurement over that measured in the first measurement and have a water absorbency of 3% to 30% by weight in the third measurement. The water absorbency in the third measurement is preferably 5% to 20% by weight, more preferably 7% to 12% by weight, in view of duration or sustainability of the deodorizing effect. An excreta treating material having too low a water absorbency in the third measurement is so water-repellent that it is unable to absorb adhered urine to be effective for deodorization, only to achieve insufficient deodorization. Conversely, an excreta treating material having too high a water absorbency in the third measurement will absorb too much urine passing through the excreta treating material, also resulting in a failure to produce a high deodorizing effect. By limiting the third water absorbency within a range of from 3% to 30% by weight, the excreta treating material maintains its capability to absorb a moderate amount of urine over long-term use so that the deodorizing effect lasts long.

To obtain a long duration of the deodorizing effect, it is preferred that the absorbency increase from the first to the third measurement be 1.1 to 6 times, more preferably 1.2 to 4 times, even more preferably 2 to 3 times. If the increase in water absorbency is insufficient, the excreta treating material is less likely to show its new site having a preserved deodorizing effect when it absorbs urine, resulting in a failure to exhibit a sufficient deodorizing effect. If, in contrast, the increase in absorbency is too large, the sites having a deodorizing effect will absorb too much urine, resulting in the reduction of duration of the deodorizing effect. Limiting the increase in water absorbency from the first to the third measurement within a range of from 1.1 to 6 times is advantageous in that the excreta treating material absorbs a moderate amount of urine to exhibit a deodorizing effect for an extended period of time.

It is essential for the excreta treating material of the present invention to have a specific gravity of 0.8 to 1.2 as measured on a virgin sample as produced (a sample not having absorbed water). The specific gravity is preferably 0.9 to 1.1, more preferably 0.98 to 1.07. An excreta treating material having too small a specific gravity easily develops many cracks from the surface into the inside thereof due to insufficient binding between constituent particles and therefore swells easily. This results in not only poor shape retention (poor appearance) and easy crumbling but also absorption of too much urine, which reduces the deodorizing performance. If the specific gravity is too high, the excreta treating material has satisfactory shape retention but hardly absorbs urine, failing to provide deodorization. With the specific gravity being limited within a range of from 0.8 to 1.2, the excreta treating material is not swollen while absorbing a moderate amount of urine thereby to continue performing its deodorizing function for an extended period of use.

In order to achieve such physical properties, one can, for example, produce the excreta treating material by pelletizing a molding material composed mainly of a ground material of plant origin by compressive extrusion and maintaining the pellets under heat. The conditions for maintaining under heat vary according to the composition of the molding material and a desired degree of compression. For example, pellets formed solely of a ground material of plant origin are preferably maintained at 150° C. to 200° C., more preferably 170° C. to 180° C., for a period of 1 to 20 hours, more preferably 2 to 6 hours, in view of water repellency, shape retention, swelling properties, and sustainability of deodorizing effect.

The material of plant origin that can be used to produce the excreta treating material of the invention may be either a herbaceous or woody plant origin. Examples of a ground material of such plant origin include ground woody plants (wood and bark), seed oil cake, ground hull of cereal grains, and ground herbaceous plants. Ground chips of woody plants, particularly softwood such as cedar, pine, and cypress are preferred for their moldability and deodorizing performance. The size of the chips (ground material) is preferably about 0.01 to 5 mm, more preferably about 0.05 to 2 mm, in view of moldability.

The excreta treating material of the present invention is preferably prepared from a molding mixture of the ground material of plant origin and, as a binder, a synthetic resin. In terms of shape retention, swell resisting force, and sustainability of the deodorizing effect, it is preferred that the ground material of plant origin be used in a proportion of 80% to 99%, more preferably 85% to 95%, even more preferably 88% to 92%, by weight and that the synthetic resin be used in a proportion of 1% to 20%, more preferably 5% to 15%, even more preferably 8% to 12%, by weight. It is preferred that pelletization of the mixture of the ground material of plant origin and the binder by compressive extrusion be effected at or above the melting point of the synthetic resin to ensure shape retention, swelling properties, and sustainability of deodorizing effect.

In a conventional technique using a mixture of a ground material of plant origin and a synthetic resin, increasing a mixing ratio of the synthetic resin results in formation of pellets with higher water repellency and lower water absorbency. However, the resulting pellets are easily swellable because, for one thing, they are porous and therefore have a reduced specific gravity, and for another, the pressure of gas generated inside destroys molded pellets from the inside. This is unfavorable in terms of shape retention and sustainability of deodorizing action. In a conventional molding process utilizing spontaneous heat during molding (JP 2002-84909A) or heat molding process (JP 9-308403A), compaction of the molding material is achieved by making use of the resisting force resulting from the inner gas pressure generated during compression. If any means for increasing the resisting force is taken to raise the degree of compaction so as to protect against destruction by the gas pressure, the amount of generated heat will increase. This leads to a contradiction: gas generation increases with the increase of heat generation to enhance the force for destroying from the inside, which eventually causes destruction. When a molding material containing a synthetic resin in an increased mixing ratio is at a high temperature at which the resin melts, it has reduced rigidity and is destroyed under irresistible gas pressure, resulting in reduction of specific gravity. For these reasons, an increase of the mixing ratio of a synthetic resin to about 10% by weight results in a specific gravity of about 0.8, and a further increase leads to a further reduction of specific gravity.

Hence, in the present invention, the molding material is treated before compression molding by, for example, preliminarily heating at 100° C. to 170° C., preferably 110° C. to 130° C., to reduce the generation of water vapor-containing gas at high temperature (to reduce the water content originated in the material of plant origin to about 8% or less). By this treatment, the inside pressure during compression can be reduced. Additionally, a means for increasing the resisting force inside the extrusion nozzle is provided to compensate for the reduction in the resisting force due to gas reduction. Such a means includes making the nozzle extremely longer or providing a bottleneck where the resisting force against the extruding force reaches the highest in the middle or near the outlet of the nozzle so that the pressure may be higher in the inside of the nozzle than at the inlet. By so doing, it has now been made possible to increase the mixing ratio of a synthetic resin without resulting in a reduction of specific gravity.

Examples of synthetic resins that can be used to make the excreta treating material of the invention include polyolefins such as polyethylene and polypropylene, polyesters such as polyethylene terephthalate, polyamides, and vinyl polymers. For serving as a binder, those having a high affinity to wood such as an ethylene-vinyl acetate copolymer are preferred. Also preferred are those having a melt flow rate (hereinafter "MFR") of 0.1 to 200 g/10 min., more preferably 0.2 to 50 g/10 min., even more preferably 2 to 15 g/10 min., to secure shape retention, swelling properties, and sustainability of deodorizing effect. The MFR is measured in accordance with JIS K7210-1999 (ISO 1133-1997).

Also preferred for use to make the excreta treating material of the invention is a mixture of a synthetic resin having an MFR of 0.1 to 100 g/10 min., preferably 0.2 to 50 g/10 min., and a tensile modulus of 100 MPa or less, preferably 70 MPa or less, and a synthetic resin having an MFR of 0.1 to 200 g/10 min., preferably 2 to 50 g/10 min., and a tensile modulus of 100 to 700 MPa, preferably 100 to 300 MPa, at a weight ratio of 1/9 to 9/1. The mixing ratio is preferably 3/7 to 7/3, more preferably 3/7 to 5/5, to ensure shape retention, swelling properties, and sustainability of deodorizing effect. Mixing a resin with low MFR and low tensile modulus and a resin with high MFR and high tensile modulus provides a molded product in which wood and the resinous material are sufficiently bound together. The molded product exhibits sufficient rigidity, does not allow excessive infiltration of water, protects the bonds from destruction, and secures moderate water resistance without increasing water repellency, which favors sustainability of the deodorizing effect.

In the production of the excreta treating material of the present invention, it is preferred not only to mix a synthetic resin into the ground material of plant origin but also to maintain the molded product under heat. In the case of pellets obtained by compression extruding a mixture containing a synthetic resin, the temperature at which the pellets are maintained is preferably about 90° C. to 200° C., more preferably 100° C. to 150° C., even more preferably 105° C. to 120° C. The time period of the heat treatment varies depending on the temperature. In view of water repellency, shape retention, swelling properties, and deodorizing effect, the treating time is 1 to 8 hours, preferably 1 to 4 hours, at 150° C. to 200° C.; 2 to 8 hours, preferably 4 to 8 hours, at 120° C. to 150° C.; 8 to 20 hours, preferably 12 to 20 hours, at 105° C. to 120° C. In particular, treating at relatively low temperatures is advantageous in that the molded product undergoes no change in color and smell between before and after the treatment and provides an excreta treatment material with improved performance while retaining the color and fragrance characteristic of wood.

If desired, the excreta treating material 1 may contain an antimicrobial agent, a colorant, etc. in addition to the above-described components. Such additives are each preferably used in an amount of 0.01% to 0.5% by weight based on the weight of the excreta treating material 1. Examples of useful antimicrobial agents include sodium benzoate, sorbic acid, potassium sorbate, didecylmethylammonium, benzalkonium chloride, polyphenols, silver, and copper.

The excreta treating material 1 is preferably produced by the following process. The process is carried out using an extrusion molding apparatus capable of high pressure extrusion equipped with adjacent pressing rolls pressing the molding mixture into the extrusion nozzle to obtain sufficient adhesiveness from the synthetic resin. By use of such an extrusion molding apparatus, the molding material can be pressed into the nozzle under high pressure, which allows for increasing the length of the extrusion nozzle and for increasing sufficiently the resisting force generated against the inner wall of the nozzle. As a result, the molding material can be compacted under high extrusion resisting force. First of all, a ground material of plant origin is thoroughly mixed with, if necessary, a powdered synthetic resin, a microbial agent, a colorant, etc. at a prescribed ratio. The mixture is fed to an extrusion molding apparatus having been heated at or above the melting point of the resin. The mixture is agitated under heat, compressed in the extrusion nozzle where the constituent particles adhere to each other, and shaped into pellets having a specific gravity of around 1.0. The resulting excreta treating material sustains a high level of deodorizing effect for an extended period of time.

In molding using the above-described molding machine, the mixture must be heated at or above the melting point of the resin. To heat the mixture, spontaneous heat generation due to compression and friction of the mixture in the machine may be taken advantage of, or a heating element such as an electrothermal heater may be used. Upon being heated, the resin melts and solidifies to bind the particles of the ground material of plant origin to provide a molded product of desired shape.

EXAMPLES

The present invention will now be illustrated with reference to Examples and Comparative Examples, but it should be understood that the invention is not construed as being limited thereto.

Example 1 to 10

Chips of softwood having a size of 0.05 to 2 mm were used as a ground material of plant origin. In Example 1, an excreta treating material was prepared by molding the wood chips. In Examples 2 to 10, an excreta treating material was prepared by molding a mixture of the wood chips and an ethylene-vinyl acetate copolymer, the MFR and elastic modulus of which are shown in Table 1 below (hereinafter "resin 1") and/or a linear low density polyethylene the MFR and elastic modulus of which are shown in Table 1 (hereinafter "resin 2") at a ratio shown in Table 1. In Example 1, an excreta treating material was prepared by molding the wood chips alone without mixing resin 1 or 2. The molding was conducted by use of a high-pressure extrusion molding machine equipped with adjacent pressing rolls. The wood chips or the mixture of the wood chips and the resin(s) is fed into the molding machine and pelletized by compressive extrusion at a temperature of 120° C. (at or above the melting point of the resin(s)). The pellets obtained in Examples 1 to 4 were heated to a temperature shown in Table 1 and maintained at that temperature for a period shown in the Table.

The specific gravity of each of the excreta treating materials obtained in Examples 1 to 10 was measured. The water absorbency of the excreta treating materials was measured three times in accordance with the method described supra. The specific gravity and the results of the first and the third measurements of water absorbency are shown in Table 1. These results prove that the excreta treating materials of Examples 1 to 10 all satisfy the requirements of the present invention.

TABLE 1

| | | Resin 1 | | | Resin 2 | | | Heating | |
|---|---|---|---|---|---|---|---|---|---|
| | | MFR (g/10 min.) | Tensile Modulus (MPa) | Ratio (wt %) | MFR (g/10 min.) | Tensile Modulus (MPa) | Ratio (wt %) | Temp. (° C.) | Time (hr) |
| Example | 1 | | | | | | | 150 | 20 |
| | 2 | | | | 25 | 125 | 3 | 150 | 6 |
| | 3 | | | | 25 | 125 | 10 | 150 | 6 |
| | 4 | 2 | 50 | 1 | | | | 150 | 6 |
| | 5 | 2 | 50 | 10 | | | | — | — |
| | 6 | 2 | 50 | 20 | | | | — | — |
| | 7 | 0.1 | 85 | 10 | | | | — | — |
| | 8 | 2 | 50 | 3 | 50 | 345 | 7 | — | — |
| | 9 | 2 | 50 | 5 | 50 | 345 | 5 | — | — |
| | 10 | 2 | 50 | 7 | 50 | 345 | 3 | — | — |
| Comparative Example | 1 | | | | | | | — | — |
| | 2 | | | | 25 | 125 | 3 | — | — |
| | 3 | | | | 25 | 125 | 10 | — | — |
| | 4 | | | | 25 | 125 | 15 | — | — |
| | 5 | | | | 25 | 125 | 20 | — | — |
| | 6 | | | | 25 | 125 | 30 | — | — |
| | 7 | 200 | 48 | 10 | | | | — | — |
| | 8 | | | | 50 | 345 | 10 | — | — |

| | | Specific Gravity (g/ml) | Absorbency (%) | | Appearance | | After 1 Mth. | Deodorizing Effect | | Over-all Judgement |
|---|---|---|---|---|---|---|---|---|---|---|
| | | | 1st | 3rd | Before Use | Swell | Disintegration | Initial | After 1 Mth. | |
| Example | 1 | 1.14 | 4 | 22 | B (*2) | A | A | A | A | B |
| | 2 | 0.99 | 5 | 19 | A | A | A | A | A | A |
| | 3 | 0.92 | 5 | 11 | A | A | A | A | A | A |
| | 4 | 1.05 | 5 | 10 | A | A | A | A | A | A |
| | 5 | 1.01 | 4 | 19 | A | A | A | A | A | A |
| | 6 | 0.82 | 4 | 16 | B (*3) | A | A | A | A | B |
| | 7 | 1.03 | 5 | 24 | A | A | A | A | A | A |
| | 8 | 1.03 | 4 | 11 | A | A | A | A | A | A |
| | 9 | 1.03 | 4 | 9 | A | A | A | A | A | A |
| | 10 | 1.03 | 4 | 8 | A | A | A | A | A | A |
| Comparative Example | 1 | 1.16 | 15 | *1 | A | — | C | C | C | C |
| | 2 | 1.01 | 5 | 45 | A | C | C | A | B | C |
| | 3 | 0.93 | 5 | 31 | A | C | B | A | A | C |
| | 4 | 0.78 | 5 | 20 | C (*3) | A | A | A | A | C |
| | 5 | 0.75 | 4 | 18 | C (*3) | A | A | A | A | C |
| | 6 | 0.66 | 4 | 4 | C (*3) | A | A | A | C | C |
| | 7 | 1.02 | 5 | 31 | A | C | B | A | B | C |
| | 8 | 1.01 | 4 | 33 | A | B | C | A | B | C |

*1: Unmeasurable (disintegrated)
(*2): Discolored
(*3): Cracked

Comparative Examples 1 to 8

Chips of softwood having a size of 0.05 to 2 mm were used as a ground material of plant origin. In Comparative Examples 2 to 8, an excreta treating material was prepared by molding a mixture of the wood chips and an ethylene-vinyl acetate copolymer the MFR and elastic modulus of which are shown in Table 1 (resin 1) or a linear low density polyethylene the MFR and elastic modulus of which are shown in Table 1 (resin 2) at a ratio shown in Table 1. In Comparative Example 1, an excreta treating material was prepared by molding the wood chips alone without using resin 1 or resin 2. The molding was conducted using a high-pressure extrusion molding machine equipped with adjacent pressing rolls in accordance with a conventional process. That is, the wood chips or the mixture of the wood chips and the resin is fed into the molding machine and pelletized by compressive extrusion by making use of spontaneous heat.

In the same manner as for the excreta treating materials of Examples 1 to 10, the specific gravity of each excreta treating materials obtained in Comparative Examples 1 to 8 was measured, and the water absorbency of the excreta treating materials was measured three times in accordance with the method described supra. The specific gravity and the results of the first and third measurements of water absorbency are shown in Table 1. These results reveal that the excreta treating materials of Comparative Examples 1 to 8 all fail to satisfy the requirements of the present invention.

The excreta treating materials of Examples 1 to 10 and Comparative Examples 1 to 8 were evaluated for appearance before use, deodorizing effect, and appearance after use for one month in accordance with the following methods. Overall judgment was made based on the results of evaluation. The results obtained are shown in Table 1 above.

[Appearance Before Use]

The excreta treating material (cylindrical pellets) immediately after the production was observed with the naked eye to rate the appearance with respect to color and surface condition of the lateral face thereof according to the following standards.

A: Having neither cracks on the lateral face nor discoloration, showing a recognizable texture of plant origin.
B: Having a few fine cracks on the lateral face and/or discoloration but still showing a recognizable texture of plant origin.
C: Having at least one of (1) a large crack on the lateral face, (2) many fine cracks on the lateral face, and (3) distinctive discoloration.

[Deodorizing Effect]

The excreta treating material 1 was put in an 80 mm diameter 40 mm high cylinder with a net bottom (mesh size: 2.8 mm) to a height of 30 mm, and 20 cc of cat urine was poured thereon. Five minutes later, the contents were smelled to evaluate the initial deodorizing effect. The excreta treating material 1 was subjected to water absorbency measurement three times, dried for 2 hours, and put in the same cylinder to the same height as described above. Twenty cubic centimeters of cat urine was poured thereon once a day for 7 consecutive days. After 5 minutes from the pouring on the 7th day, the contents were smelled to evaluate the deodorizing effect, which was regarded as the deodorizing effect after use for one month. The evaluation was made based on the following standards. The urine sample was collected from a cat once a day and frozen. The frozen urine was thawed and warmed to 40° C. upon each pouring operation.

A: Odorless or having an unrecognizable slight odor.
B: Having a recognizable but faint odor.
C: Having a distinctively recognizable unpleasant odor.

[Appearance After One Month]

Each of the excreta treating material 1 having been measured for water absorbency three times followed by drying for 2 hours (sample after measurement) and the excreta treating material 1 not having been measured for water absorbency (sample before measurement) was put in a 40 mm diameter 60 mm high cylinder (capacity: 75.4 ml), leveled with at the top of the cylinder, and weighed. The bulk density was calculated from the following equation.

Bulk density=measured weight (g)/75.4

A volumetric expansion was then calculated from the following equation to evaluate the swell.

Volumetric expansion=bulk density before measurement/bulk density after three-times measurement−1

Furthermore, the excreta treating material 1 having been measured for water absorbency three times followed by drying for 2 hours was put in a 80 mm diameter 40 mm high cylinder with a net bottom (mesh size: 2.8 m). The contents were transferred into another cylinder of the same kind. The transfer between the two cylinders was repeated 50 times. The dust produced and dropped through the net was weighed to evaluate disintegration. The standards of evaluation of swell and disintegration are shown below. The appearance of the excreta treating material 1 having been measured for water absorbency three times and dried for 2 hours was evaluated as the appearance after use for one month.

Standards of evaluating swell:
A: Volumetric expansion of within 50%.
B: Volumetric expansion of 50% or more and less than 100%.
C: Volumetric expansion of 100% or more.

Standards of evaluating disintegration:
A: Amount of dust of within 0.1% based on the weight of the excreta treating material 1 before measurement.
B: Amount of dust of 0.1% or more and less than 1% based on the weight of the excreta treating material 1 before measurement.
C: Amount of dust of 1% or more based on the weight of the excreta treating material 1 before measurement.

[Overall Judgment]

The excreta treatment material was comprehensively judged in accordance with the following standards based on the results of evaluation of appearance before use, deodorizing effect, and appearance after use for one month.

A: All A's.
B: Only one B with no C.
C: Two or more B's or one or more C's.

It is seen from the results in Table 1 above that the excreta treating materials of Examples 1 to 10 according to the present invention exhibit high water resistance against change in appearance and disintegration and maintains a high level of deodorizing performance during long-term use, for example, for more than one month.

Industrial Applicability

The pet excreta treating material according to the present invention lasts long without removal or replenishment, undergoes little change in appearance, exhibits water resistance against swell or disintegration, and maintains a high level of deodorizing performance during long-term use, for example, for more than one month.

The invention claimed is:
1. A pet excreta treating material comprising a ground material of plant origin as a main component and having the following properties:

(1) a higher water absorbency in a third measurement than in a first measurement,
(2) a water absorbency of 3% to 30% by weight in the third measurement, and
(3) a specific gravity of 0.8 to 1.2 as measured before the first measurement of water absorbency,
wherein properties (1) and (2) have been measured as follows:
the pet excreta treating material having been dried in a thermostat at 40° C. for 2 hours is immersed in 25° C. water for 3 seconds, and the resulting weight increase as represented by the following equation is taken as a water absorbency (%);
the second and following measurements are carried out by drying the excreta treating material immediately after the preceding measurement in a thermostat at 40° C. for 2 hours, immersing the dried material in 25° C. water for 3 seconds, and calculating the water absorbency (%) in the same manner as in the first measurement;
wherein the water absorbency (%)=[(weight of excreta treating material after immersion−weight of excreta treating material before immersion)/(weight of excreta treating material before immersion)]×100.

2. The pet excreta treating material according to claim 1, wherein the increase in absorbency from the first to the third measurement is 1.1 to 6 times.

3. The pet excreta treating material according to claim 1, which is obtained by pelletizing a molding material comprising the ground material of plant origin as a main component by compressive extrusion and maintaining the resulting pellets under heat.

4. The pet excreta treating material according to claim 1, which is obtained by mixing 80% to 99% by weight of the ground material of plant origin and 1% to 20% by weight of a synthetic resin having a melt flow rate of 0.1 to 200 g/10 min. and pelletizing the resulting mixture by compressive extrusion at or above the melting point of the synthetic resin.

5. The pet excreta treating material according to claim 4, wherein the synthetic resin is a mixture of a resin having a melt flow rate of 0.1 to 100 g/10 min. and a tensile modulus of 100 MPa or less and a resin having a melt flow rate of 0.1 to 200 g/10 min and a tensile modulus of 100 to 700 MPa at a weight ratio of 1/9 to 9/1.

6. The pet excreta treating material according to claim 1, which has a water absorbency of 2% to 9% by weight in the first measurement.

7. The pet excreta treating material according to claim 1, which has a water absorbency of 4% to 7% by weight in the first measurement.

8. The pet excreta treating material according to claim 1, which has a water absorbency in the third measurement of 5 to 20% by weight.

9. The pet excreta treating material according to claim 1, wherein the ground material of plant origin comprises chips of soft wood.

10. The pet excreta treating material according to claim 1, wherein the ground material of plant origin is of a woody plant.

11. A pet excreta treating system comprising the pet excreta treating material according to claim 1, a tray, an absorbent material in sheet or plate form, and a permeable drainboard.

12. A pet excreta treating material comprising a ground material of plant origin as a main component and a synthetic resin, and having the following properties:
(1) a higher water absorbency in a third measurement than in a first measurement,
(2) a water absorbency of 3% to 30% by weight in the third measurement, and
(3) a specific gravity of 0.8 to 1.2 bas measured before the first measurement of water absorbency,
wherein properties (1) and (2) have been measured as follows:
the pet excreta treating material having been dried in a thermostat at 40° C. for 2 hours is immersed in 25° C. water for 3 seconds, and the resulting weight increase as represented by the following equation is taken as a water absorbency (%);
the second and following measurements are carried out by drying the excreta treating material immediately after the preceding measurement in a thermostat at 40° C. for 2 hours, immersing the dried material in 25° C. water for 3 seconds, and calculating the water absorbency (%) in the same manner as in the first measurement;
wherein the water absorbency (%)=[(weight of excreta treating material after immersion−weight of excreta treating material before immersion)/(weight of excreta treating material before immersion)]×100.

13. A pet excreta treating material comprising a ground material of plant origin as a main component, obtained by pelletizing a molding material comprising the ground material of plant origin as a main component by compressive extrusion and maintaining the resulting pellets under heat, and having the following properties:
(1) a higher water absorbency in a third measurement than in a first measurement,
(2) a water absorbency of 3% to 30% by weight in the third measurement, and
(3) a specific gravity of 0.8 to 1.2 bas measured before the first measurement of water absorbency,
wherein properties (1) and (2) have been measured as follows:
the pet excreta treating material having been dried in a thermostat at 40° C. for 2 hours is immersed in 25° C. water for 3 seconds, and the resulting weight increase as represented by the following equation is taken as a water absorbency (%);
the second and following measurements are carried out by drying the excreta treating material immediately after the preceding measurement in a thermostat at 40° C. for 2 hours, immersing the dried material in 25° C. water for 3 seconds, and calculating the water absorbency (%) in the same manner as in the first measurement;
wherein the water absorbency (%)=[(weight of excreta treating material after immersion−weight of excreta treating material before immersion)/(weight of excreta treating material before immersion)]×100.

\* \* \* \* \*